US011835416B2

(12) United States Patent
Sonzogni et al.

(10) Patent No.: US 11,835,416 B2
(45) Date of Patent: Dec. 5, 2023

(54) POLARIZING FILTER

(71) Applicant: MEI S.r.l., Bergamo (IT)

(72) Inventors: Stefano Sonzogni, Bergamo (IT); Angelo Dolci, Bergamo (IT)

(73) Assignee: MEI S.r.l., Bergamo (IT)

(*) Notice: Subject to any disclaimer, the term of this patent is extended or adjusted under 35 U.S.C. 154(b) by 347 days.

(21) Appl. No.: 17/276,512

(22) PCT Filed: Sep. 9, 2019

(86) PCT No.: PCT/EP2019/073958
§ 371 (c)(1),
(2) Date: Mar. 16, 2021

(87) PCT Pub. No.: WO2020/058022
PCT Pub. Date: Mar. 26, 2020

(65) Prior Publication Data
US 2021/0318204 A1 Oct. 14, 2021

(30) Foreign Application Priority Data

Sep. 20, 2018 (EP) .................................. 18195692

(51) Int. Cl.
G01N 21/21 (2006.01)
G01M 11/02 (2006.01)
(Continued)

(52) U.S. Cl.
CPC ......... *G01M 11/0221* (2013.01); *G01N 21/21* (2013.01); *G02B 5/3025* (2013.01); *G02B 27/28* (2013.01)

(58) Field of Classification Search
CPC .......... G01M 11/0221; G01M 11/0285; G01N 21/21; G02B 5/3025; G02B 27/28; G01J 4/02
See application file for complete search history.

(56) References Cited

U.S. PATENT DOCUMENTS 5,365,371 A 11/1994 Kamon et al.
2008/0239067 A1* 10/2008 Lipton ................. H04N 13/334
348/54

(Continued)

FOREIGN PATENT DOCUMENTS

DE 42 10 304 A1 10/1992

OTHER PUBLICATIONS

Prutchi, David; DOLPi_Mech: A Slower But More AccurateImaging Polarimeter; Aug. 24, 2015 (Year: 2016).*

(Continued)

Primary Examiner — Roy M Punnoose
(74) Attorney, Agent, or Firm — The H.T. Than Law Group

(57) ABSTRACT

The present invention is directed to a polarizing filter (20), comprising a plurality of areas (25) for passing light, each area (25) being separated from the others, wherein each of the areas (25) is a linear polarizer and at least two of the areas (25) have a different polarization axis. The present invention is further directed to an apparatus (1) for determining an orientation of a lens polarization axis of a polarized lens (31) and using said polarizing filter (20) as well as a method of determining an orientation of a lens polarization axis of a polarized lens (31) using said apparatus (1).

19 Claims, 2 Drawing Sheets

(51) Int. Cl.
G02B 5/30 (2006.01)
G02B 27/28 (2006.01)

(56) References Cited

U.S. PATENT DOCUMENTS

2008/0239068 A1* 10/2008 Lipton ................. H04N 13/334
 348/60
2012/0300193 A1 11/2012 Zhigang et al.
2014/0055664 A1 2/2014 Yamagata et al.
2018/0052074 A1* 2/2018 Trumm .............. G01M 11/0221

OTHER PUBLICATIONS

International Search Report issued in connection with the corresponding international application No. PCT/EP2019/073958 dated Nov. 29, 2019.
European Search Report issued in connection with the corresponding priority European application No. 18 19 5692 dated Feb. 11, 2019.
European Office Action issued in connection with the corresponding priority European application No. 18 195 692.1 dated Dec. 10, 2020.
Machine translation of DE 42 10 304 A1 to Kanzaki Paper MFG. Co. Ltd.

* cited by examiner

POLARIZING FILTER

FIELD OF THE INVENTION

The present invention relates to a polarizing filter as well as an apparatus for determining an orientation of a lens polarization axis of a polarized lens using said polarizing filter as well as a method of determining said orientation.

BACKGROUND OF THE INVENTION

It is commonly known in the prior art to use polarized eyeglasses to reduce the reflection of light—usually sunlight—off of non-metallic surfaces. Sunlight usually is unpolarized and reflection of such light from non-metallic surfaces results in some degree of a polarization of said light usually parallel to the ground surface or reflective surface; i.e. it is usually reflected horizontally and thus becomes polarized. The incoming bundle of light hitting the surface thus becomes concentrated and is blinding anyone observing it. This is also known as (blinding) glare.

It is well known in the prior art to use polarized lenses to avoid glare. Therefore, the lenses or eyeglasses are laminated with a corresponding chemical in a vertical pattern, which pattern blocks the light that is horizontal to thus eliminate glare. This comes about since the horizontal light waves do not fit through the chemical laminate pattern and are thus filtered out. Hence, the orientation of the polarization axis of the polarized lens is of utmost importance when producing eyeglasses from said lenses.

For producing such eyeglasses, there are known processes to identify the orientation of the polarization axis of said lens, which in turn is necessary to carry out the edging step of the lens to produce eyeglasses having the desired, i.e. vertically oriented, polarization axis.

For determination of the particular orientation of polarization axis of a lens, there is usually used a filter having a defined and known orientation of the polarization axis. This lens is positioned to overlap with the polarized lens in a viewing direction of the lens. The filter and the lens are then relatively rotated with respect to each other about an axis being perpendicular to both the lens and the filter. A light source is provided to emit non-polarized light through both the lens and the filter preferably on a convex site of the lens. On the other side of the light source with respect to the lens and filter, there is provided a sensor detecting the light coming from the light source and having passed both the lens and the filter. The sensor can measure the amount of light passing through the overlapped arrangement of lens and filter.

It is known that two polarization lenses with the same orientation of polarization (polarization axes aligned parallel to each other) allow light waves passing these lenses, while they block almost all light waves in case the lenses are rotated relative to each other by a 90° angle (polarization axes aligned perpendicular to each other). This comes about since light hitting the filter is polarized in a particular direction due to the orientation of the respective polarization axes. If the polarization axis of the lens is the same, i.e. aligned parallel, with respect to the polarization axis of the filter, light can pass through both of them. If the orientation of the polarization axis of the lens is aligned perpendicular to the one of the filter, the light is blocked fir the reasons already defined herein above. Between a 0° and a 90° angle of the polarization axes of lens and filter, there is a smooth transmission of the degree of blocking light waves. Hence, such an polarization filter can be used to detect the orientation of polarization of a lens based on the amount of light having passed the system of filter and lens. The detection is based on the principle that unpolarised light passing through two polarized optical elements undergoes a reduction of intensity dependent on the angle formed between the polarization axes of these two elements.

There are known machines which use a polarized filter to detect the orientation of polarization of a polarized lens by measuring the light passing through this arrangement at different angles. Therefore, the lens and the filter are rotated relative to each other while carrying out multiple measurements from which the orientation of polarization can then be determined, e.g. by average determination or the like. Once knowing the orientation of the polarization axis of the lens, the lens can be edged accordingly to thus result in eyeglasses having a defined (vertical) orientation of its polarization axis. Usually, about ten measures at different angles are sufficient for a precise detection of the orientation of the polarization axis as the light intensity varies following a sinusoidal law.

The known machines for rotating the polarization filter relevant to the polarized lens are quite expensive and require a controlled rotation axis with constant reference point while allowing a smooth and precise movement. There are known manual as well as automatic machines. The manual machines leave it to the operator to determine the orientation of the polarization axes due to the amount of light passing through the system, which is manually observed by the user. Automatic machines use light sensors to detect the amount of light and thus determine the orientation of the polarization axis from the amount of light received by the sensor.

SUMMARY OF THE INVENTION

It is thus now an object of the present invention to provide simple and cost efficient means for an easy determination of an orientation of a lens polarization axis of a polarized lens.

According to a first aspect of the present invention there is provided a polarizing filter which comprises a plurality of areas for passing light, each area being separated from the others, wherein each of the areas is a liner polarizer (i.e. having a defined (orientation of) polarization axis) and at least two of the areas have a different, i.e. a different and distinguishable, (orientation of the/its) polarization axis (to each other), preferably (substantially) in the same plane (i.e. the polarization axes all extend in the same or (substantially) parallel planes).

In other words, the polarization filter comprises a plurality of areas being provided somehow next to each other in a viewing direction. These areas are each linear polarizes which only allow light of a particular polarization to pass through. According to the invention, "different polarization axis" or "different and distinguishable polarization axis" means that the polarization axes of at least two of the areas draw an angle α which allows to determine a difference in polarization between these two areas. Said angle α may be preferably between 1° and 45° and more preferred 1°, 2°, 5°, 7.5°, 10°, 15°, 20°, 22.5° or 45°.

By means of the polarization filter according to the present invention, it is possible to use only one polarizing filter to allow for many different relative orientations of polarization axes of filter on the one hand and polarized lens to be detected on the other hand at the same time, so that a relative movement between said filter and a polarized lens to be detected can be avoided while easily allowing determination of the polarization axis of the polarized lens.

The polarizing filter can be a polarizing filter disk, preferably comprising a disk body. The disk body can be solid. Hence, the polarizing filer can be easily provided. The disk body can be non-transparent. The areas can be provided as windows in the disk body; particularly when being made of a non-transparent material. These windows may comprise and are preferably closed with a linearly polarized filter element, like a foil, as the linear polarizer.

The polarizing filter can comprise an explicit or implicit reference based on which (the orientation of) the polarization axes of the areas can be derived. Hence, the different and distinguishable polarization axes of the areas are set and thus already known. This allows for the polarization axes of the areas be easily derivable from the polarizing filter to thus allow an accurate and easy measurement of the orientation of a polarization axis of a polarized lens to be detected. The reference preferably comprises at least one of the group consisting of a reference mark on the polarization filter (preferably the disk body), the shape of the polarizing filter (preferably the disk body), the position of at least one or more or all areas (preferably the windows) with respect to each other and/or on the polarization filter (preferably the disk body), and/or the shape of at least one or more or all areas (preferably the windows). Of course, any other references known in the prior art can be provided to allow for the polarization axes of the areas to be derived therefrom. For instance, each of the areas can also be provided with a visual reference, like an arrow directed into the direction of the polarization axis, a code (e.g. a barcode), a number indicating the angle of the polarization axis, e.g., with respect to a reference axis, or the like.

The areas can be arranged in a defined manner, preferably in a checkered manner or along a circle, and preferably in an evenly distributed manner. This allows for an easy determination of the orientation of the polarization axis of a polarized lens. In particular, the arrangement along a circle may allow for a well defined and recognizable orientation of the polarization axes of the areas. For instance, the polarization axes of the areas which are arranged along a circle may each be oriented such that they cross each other in a defined manner. Preferably, they can cross each other in a centre of the (imaginary) circle so that the position of the areas allows for an easy derivation of their respective polarization axis.

At least some and preferably all areas (preferably the windows) have an identical shape. The shape of these areas can be, for instance, circular, rectangular, square, arrow or 'segment of a circle' shaped. In case of an arrow shaped area, an arrow head of said area may point in a direction along the polarization axis of this area. This may also be the explicit reference based on which the polarization axis of the areas can be easily derived.

The orientation of the different and distinguishable polarization axes is distributed, preferably evenly distributed, over a range of at least 90°. In addition or alternatively, the polarization axes of the at least two areas having a different and distinguishable polarization axis form an angle α of at least 15°, preferably at least 10°, more preferably at least 5° and most preferably 2°, respectively. In fact, said angle α may be preferably in a range between 1° and 45° and more preferred 1°, 2°, 5°, 7.5°, 10°, 15°, 20°, 22.5° or 45°. In other words, every area having a different and distinguishable polarization axis with respect to another area has a polarization axis which draws an angle α with the polarization axis of the other mentioned area as mentioned herein above, respectively. This allows for an easy determination of the orientation of the polarization axis of a polarized lens to be detected with the given polarization filter in a highly accurate and still in a very easy and cost-efficient manner.

The polarizing filter and preferably the disk body may comprise a round, preferably circular, or a polygonal, preferably rectangular or square, shape. However, the shape of the polarization filter is not limited by the present invention. In case of a non-symmetrical shape, the shape itself can be a reference based on which the polarization axes of the areas can be derived as already mentioned herein above.

According to another aspect to the present invention there is provided an apparatus for determining an orientation of a lens polarization axis of a polarized lens. Said apparatus comprises a light source for emitting non-polarized light. Further, the apparatus comprises a lens receiving section for receiving the lens. The lens receiving section is preferably configured such that the lens can be received alone or may already be assembled on a frame when received by the lens receiving section. Moreover, the apparatus comprises a polarization filter according to the present invention. The lens receiving section and the polarizing filter are arranged such that light emitted by the light source successively passes through the areas of the polarizing filter and the lens receiving section; i.e. in the mentioned order or the other way around. Hence, by use of this apparatus, the orientation of a lens polarization axis of a polarized lens to be detected and received in the lens receiving section can be measured based on the plurality of areas having different and distinguishable polarization axes so that the orientation of the lens polarization axis can be easily determined in an easy and accurate manner without the need of a rotation of the lens and the polarizing filter relative to each other.

The apparatus may further comprise a light intensity measuring device for receiving light of the light source which has passed the areas of the polarizing filter and the lens receiving section. The light intensity measuring device may be configured to detect different light intensities related to the respective areas of the polarizing filter, if a polarized lens to be detected is positioned in the lens receiving section. This allows for an easy detection of the different amounts of light passing through the respective areas in combination with the lens to thus determine the orientation of the lens polarization axis of the polarized lens. The light intensity measuring device may comprise a light sensor, a camera, a camera based system, and/or a light detector like an individual light detector and/or a multiple light detector. Also, other known light intensity measuring devices can be used in the apparatus according to the present invention, i.e. any kind of light sensor.

The apparatus may further comprise a control system to control the apparatus, preferably at least the light intensity measuring device for determining the orientation of the lens polarization axis of a polarized lens positioned in the lens receiving section based on the detected different light intensities of the respective areas in correlation with their respective polarization axes. This is preferably done upon use of a reference (sinusoidal) calculation. The use of a control system thus preferably allows for a semi-automatic or automatic determination of the orientation of the lens polarization axis of a polarized lens to be detected.

In a most preferred embodiment, the polarizing filter and the lens receiving section are statically provided with respect to each other; preferably the polarizing filter is a static polarizing filter. This is possible as the different areas allow for detection of different relative orientations of their polarization axes with respect to the lens polarization axis to be determined so that a relative movement between the polarized lens and the polarizing filter can be avoided.

According to another aspect of the present invention there is provided a method of determining an orientation of a lens polarization axis of a polarized lens. Said method comprises the steps of:

provide an apparatus according to the present invention, placing a linearly polarized lens to be detected in the lens receiving section, preferably such that its convex side is directed or bulges out towards the light source, wherein the lens can be received alone or may already be assembled on a frame when placed in the lens receiving section, operating the light source to emit non-polarized light towards and then the light successively through the areas of the polarizing filter and the polarized lens in the lens receiving section (i.e. the light can successively pass through the areas first and then the polarized lens or the other way around; after having passed the first element of the polarizing filter and the polarized lens, the non-polarized light of the light source is polarized before it hits the second element of the polarizing filter and the polarized lens), detecting the different light intensities related to the respective areas of the polarizing filter of the light that has passed the areas of the polarizing filter and the polarized lens, and determining the orientation of the lens polarization axis of the polarized lens based on the detected different light intensities of the respective areas in correlation with their respective polarization axis.

By means of said method, the orientation of a lens polarization axis of a polarized lens to be detected can be easily determined without the need of relative movement of the lens with respect to the filter in an easy and accurate manner. The orientation can then be manually detected; but also semi-automatically or automatically.

For instance, the step of detecting the different light intensities can be carried out by the light intensity measuring device defined herein above, which receives/detects all the light that has passed both the areas and the lens.

Moreover, the step of determining the orientation of the lens polarization axis can be carried out by the control system. In this regard, the control system can preferably output the determined data and/or data received from or detected by the light intensity measuring device. This can be done, for instance, to display said data on an output device and/or for use in another process step, e.g. in an edging step for edging the lens based on the orientation of the lens polarization axis and/or in a final inspection step preferably after the edging step. The edging step and/or the final inspection can also be covered by the method according to the present invention.

BRIEF DESCRIPTION OF THE DRAWINGS

Further aspects, details and advantages of the present invention are described in the following with reference to the drawings of the enclosed figures.

DETAILED DESCRIPTION OF THE PREFERRED EMBODIMENTS

Figure 1:
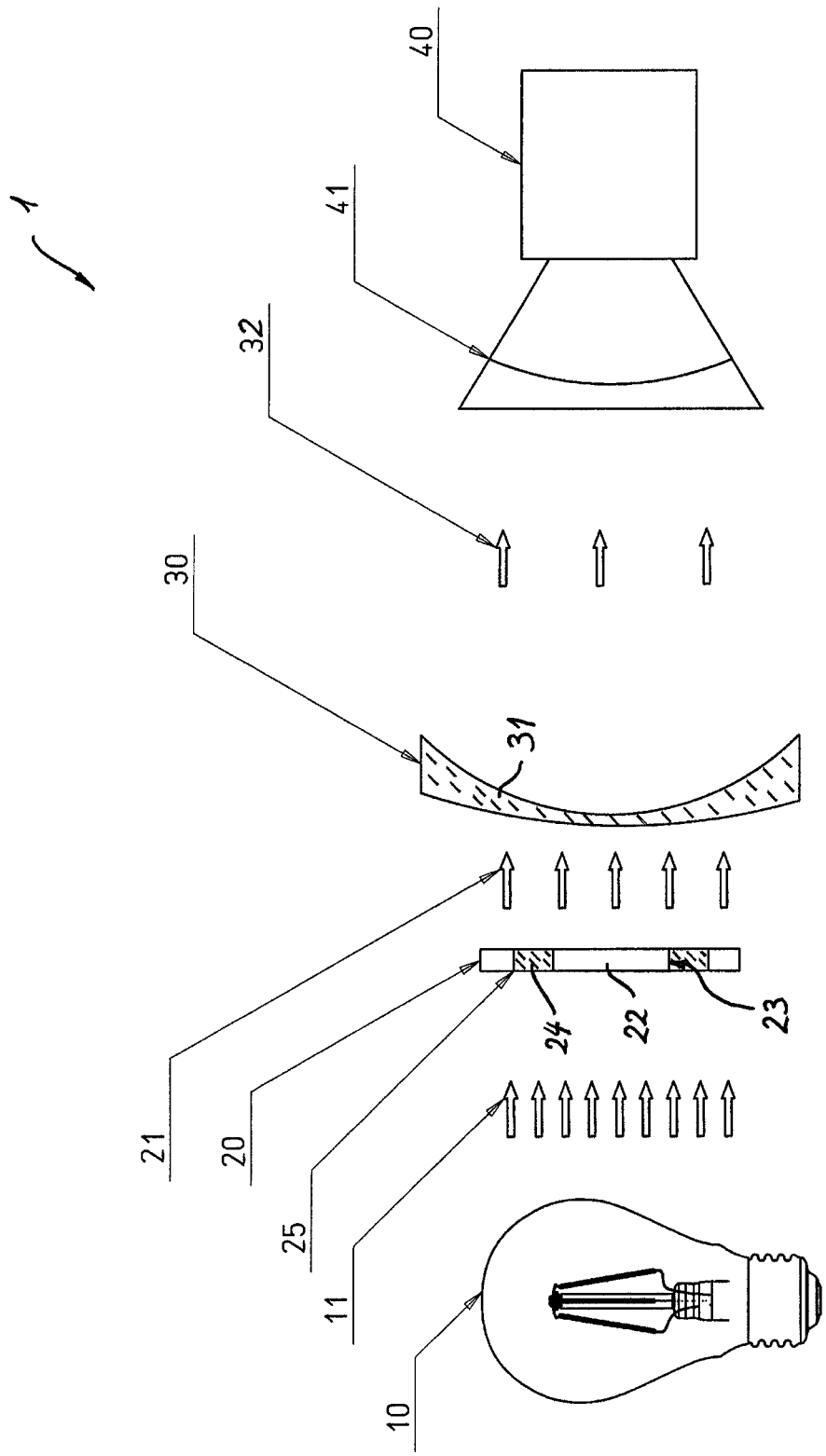
FIG. 1 shows a schematical side view of an apparatus according to a first embodiment of the present invention.

FIG. 1 shows an apparatus 1 for determining an orientation of a lens polarization axis of a polarized lens 31. The apparatus 1 comprises a light source 10 for emitting non-polarized light 11. Said light source 10 can be any kind of light source 10, such like a common light bulb, LED lamps, fluorescent lamps, or any other kind of light source 10 as long as emitting non-polarized light.

The apparatus 1 further comprises a lens receiving section 30 for receiving the lens 31. The polarized lens 31 has already been placed in the lens receiving section 30 in FIG. 1. The lens receiving section 30 can comprise any kind of structural features to receive and hold the lens in place, e.g. by clamping. The lens receiving section 30 preferably allows for easily and removably placing the polarized lens 31 therein to thus position the lens 31 within the apparatus in a defined manner. Preferably, the lens 31 is placed in the lens receiving section 30 such that its convex side is directed or bulges out towards the light source 10.

The polarized lens 31 to be detected as shown in FIG. 1 is a corrective lens being position in the lens receiving section 30 with its convex side towards the light source 10. However, the lens 31 to be detected can be of any size, material, colour, power and can comprise any kind of coating as long as it is a polarized lens 31. The lens 31 could also be a plano lens without prescription or a full shield lens. Also the outer contour/shape of the lens 31 or its final shape after edging is not limited by the invention.

Moreover, the apparatus 1 comprises a polarizing filter 20 according to the present invention. This polarizing filter 20 can be fixedly provided within the apparatus 1. However, it is also possible and preferred that the polarizing filter 20 is detachably provided in the apparatus 1 to thus allow removal or replacement of the polarizing filter 20 for maintenance reasons or for providing different kinds of polarizing filters 20 in the apparatus 1. The polarizing filter 20 also alone forms an individual part, i.e. subject-matter, of the present invention.

Figure 2:
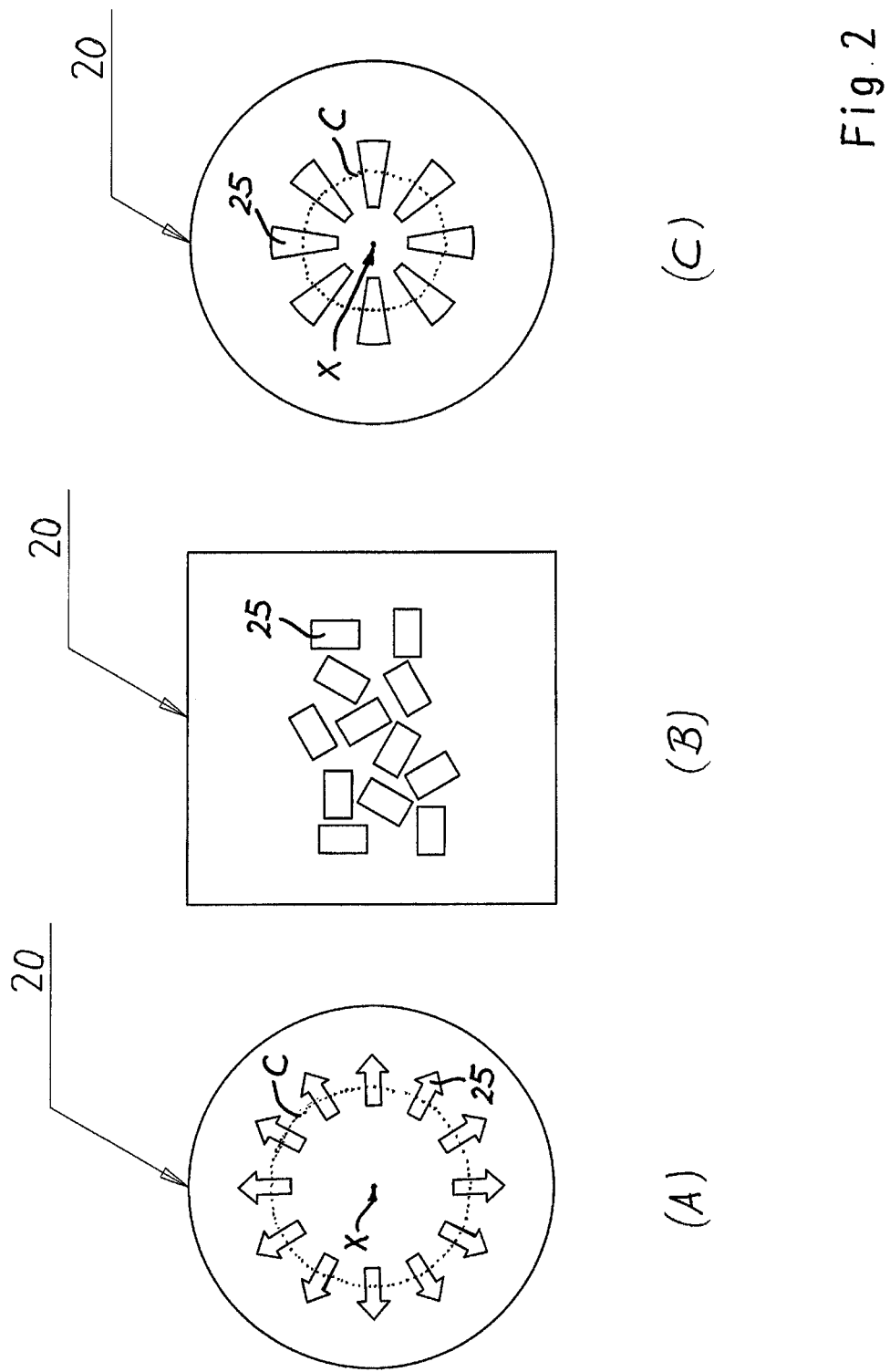
FIG. 2 shows three different embodiments of a polarizing filter according to the present invention.

The polarizing filter 20 comprises a plurality of areas 25 for passing light there through. As can be seen in FIG. 2, each area 25 is separated from the other areas 25 so that they do not overlap in the viewing direction, i.e. an operating viewing direction, as shown in FIG. 2. The areas 25 preferably all extend in the same or parallel planes.

As depicted in the different embodiments of FIG. 2, all of the areas 25 can have an identical shape. In FIG. 2A, the areas 25 have an arrow shape, in FIG. 2B the areas 25 have a rectangular shape, and in FIG. 2C the areas 25 have a 'segment of a circle' shape. Of course, any other kind of shapes are possible for the areas 25. They may also have different shapes.

Each of the areas 25 is a linear polarizer and at least two and preferably more of the areas 25 have different and distinguishably (orientations of the/its) polarization axis to each other. Preferably, the polarization axes of the areas 25 a least partially but preferably all extend in substantially the same plane or (substantially) parallel planes. For instance, with reference to FIG. 2A, the arrow shaped areas 25 have an arrow head which—here—points in a direction along the polarization axis of the respective area 25.

The areas 25 may thus be arranged in a defined manner as exemplary shown in FIGS. 2A and 2C where the areas 25 are arranged along a circle. Moreover, the areas 25 may also be arranged in an evenly distributed manner. They may also be provided in a checkered manner. However, also an undefined arrangement of the areas 25 as shown in FIG. 2B is possible. In this regard, the polarization axis of the respective areas 25 may be oriented along their longitudinal extension of the rectangular layout.

Again, with respect to FIG. 2C, the polarization axes of the areas 25 arranged along a circle may each be oriented such that they cross each other in a defined manner and here preferably in a center X of the (imaginary) circle C.

In any case, the polarizing filter 20 may comprise an explicit or even implicit reference based on which the polarization axes of the areas 25 can be derived. The reference may preferably comprise a reference mark on the polarizing filter 20. The reference could also comprise the shape of the polarizing filter 20, e.g. when having a rectangular shape. However, the polarizing filter 20 may also comprise any other shape which can be used as a reference or even not, like a round shape as shown in FIGS. 2A and 2C showing circular polarizing filter 20. It may also be provided in a polygonal shape, like a square shape as shown in FIG. 2B. The reference may also comprise the position of at least one or more or all areas 25 with respect to each other and/or on the polarizing filter 20. This position could be the arrangement of the areas 25 along a circle C as shown in FIGS. 2A and 2C or it could also be a known or clearly defined arrangement of the areas 25 as, for instance, shown in FIG. 2B. The reference may also comprise the shape of at least one or more or even all areas 25, like the orientation of the arrow-shaped areas 25 in FIG. 2A, the longitudinal extension of the rectangular areas 25 of FIG. 2B, or the orientation of the areas arranged along a circle C which polarization axis may all cross the center X of said circle C.

The orientation of the different and distinguishable polarization axes of the areas 25 can be distributed and preferably evenly distributed; preferably over a range of at least 90° to preferably cover the full range of relative orientation of the polarization axes of the polarization filter, i.e. its areas, with respect to a the lens polarization axis of a polarized lens to be detected therewith. The areas 25 in FIG. 2, for instance, have orientations of the polarization axis over a range of 180/360°. With respect to FIGS. 2A and 2C, this means that there will be two bright areas 25 being opposite to each other, two dark areas 25 being opposite to each other and arranged perpendicular (i.e. in a 90° angle with respect) to the bright areas 25, and several intermediate areas 25 in-between.

The polarization axes of the at least two areas 25 having a different and distinguishable polarization axis form an angle $\alpha$ of at least 15°, preferably at least 10°, more preferably at least 7.5°, even more preferably at least 5°, and most preferably at least 2°, respectively. The polarization axes of at least two of the areas 25 may preferably draw an angle $\alpha$ which allows to determine a difference in polarization between these two areas. Said angle $\alpha$ can preferably be between 1° and 45° and more preferred 1°, 2°, 5°, 7.5°, 10°, 15°, 20°, 215° or 45°.

The polarizing filter 20 preferably is a polarizing filter disk which may comprise a disk body 22 which can be solid and which could also be non-transparent. The areas 25 can then be provided as windows 23 in the disk body 22. The windows 23 could then comprise and more preferred could be closed with a linearly polarized filter element, like a foil 24, as the linear polarizer. The shape of the areas 25 is then given by the shape of the windows 23. The disk body 22 can have any shape and transparency and can be made of any material.

Now again turning to FIG. 1, the lens receiving section 30 and the polarizing filter 20 are arranged such that light 11 emitted by the light source 10 successively passes through the areas 25 of the polarizing filter 20 and the lens receiving section 30, wherein the sequence in which the light passes through these two elements is not limited by the present invention, i.e. light could pass first through the areas 25 and then the lens receiving section 30—here holding the polarized a lens 31 to be detected—, or through the lens receiving section 30 first and then through the areas 25, as long as the light successively passes both the areas 25 and the lens receiving section 30 (i.e. the polarized lens 31 if received by or positioned in the lens receiving section 30).

As can be seen in FIG. 1, the apparatus 1 could preferably comprise a light intensity measuring device 41 for receiving light 32 of the light source 10 which has passed the areas 25 of the polarizing filter 20 and the lens receiving section 30. The light intensity measuring device 41 is configured to detect different light intensities related to the respective areas 25 of the polarizing filter 20, if a polarized lens 31—as shown—is positioned in the lens receiving section 30. Hence, the apparatus 1 can determine the orientation of a lens polarization axis of a polarized lens 31 by use of a corresponding light sensor element 41. The light intensity measuring device 41 could comprise any kind of light sensor, a camera, a camera based system, a light detector, like an individual light detector and/or a multiple light detector, and/or any other kind of light sensor/detector.

In a preferred embodiment, the apparatus 1 could further comprise a control system 40 to control the apparatus 1 and preferably at least the light intensity measuring device 41 for determining the orientation of the lens polarization axis of the polarized lens 31 positioned in the lens receiving section 30 based on the detected different light intensities of the respective areas 25 in correlation with their respective polarization axes. This preferably upon use of a reference (sinusoidal) calculation. In a preferred embodiment of the invention, the control system 40 may also automatically determine the orientation of polarization axes of the areas based on, i.e. derived from, the explicit/implicit reference of the polarizing filter 20.

As the polarizing filter 20 comprises the plurality of areas 25, the polarizing filter 20 and the lens receiving section 30 (and thus also a polarized lens 31 when received in the lens receiving section 30) can be statically provided with respect to each other.

In the following, a method of determining an orientation of a lens polarization axis of a polarized lens 31 is described.

In a first step, an apparatus according to the present invention is provided.

In a second step, a linearly polarized lens 31 to be detected is placed in the lens receiving section 30 to be thus positioned in series with the polarizing filter 20. The lens may be positioned in the lens receiving section 30 such that its convex side is directed to or bulges out toward the light source.

In a third step, the light source 10 is operated to emit non-polarized light 11 towards and then the light proceeds successively through the areas 25 of the polarizing filter 20 and the polarized lens 31 in the lens receiving section 30. Here, the non-polarized light 11 is polarized for each of the areas 25 according to the respective orientation of their polarization axis when passing the polarizing filter 20 which light thus proceeds as polarized light 21 here towards the polarized lens 31 or lens receiving section 30. After having passed the polarized lens 31, the light intensities of the light with respect to each of the areas 25 differs due to the difference of the orientation of the polarization axes of the respective areas 25 with respect to the lens polarization axis of the polarized lens 31.

In a fourth step, the different light intensities related to the respective areas 25 of the polarizing filter 20 of the light 32 that has passed the areas 25 of the polarizing filter 20 and the polarized lens 31 are detected. In a preferred embodiment, the step of detecting the different light intensities can be carried out by the light intensity measuring device 41.

In a fifth step, the orientation of the lens polarization axis of the polarized lens 31 based on the detected different light intensities of the respective areas 25 in correlation with their respective (orientation of) polarization axis is determined. This determination can be done manually; e.g. by an operator simply comparing the light intensities of the respective light areas/spots with respect to the areas 25 and in correlation with the (orientation of) the polarization axes of the respective areas 25. However, at least the last step or even the whole method could also be carried out semi-automatic or automatic. For instance, at least the step of determining the orientation of the lens polarization axis can be carried out by the control system 40. The control system 40 may output the determined data and/or data received from the light intensity measuring device 41. The data may preferably be displayed on an output device and/or for use in another process step. Another process step could be an edging step for edging the lens based on the orientation of the lens polarization axis. The edging step can, for instance, be integrated in the method according to the present invention or could be a separate method step being performed later. In this regard, it could be helpful to somehow mark the lens to identify the orientation of lens polarization axis. Moreover, the data could also be used in a final inspection step, preferably after an edging step, which inspection step could also be integrated in the method according to the present invention.

The present invention is not limited by the embodiments described herein above as long as being covered by the appended claims. All the features described above in the embodiments can be combined and/or replaced in any given manner.

The invention claimed is:

1. An apparatus (1) for determining an orientation of a lens polarization axis of a polarized lens (31), comprising:
a light source (10) for emitting non-polarized light (11),
a lens receiving section (30) for receiving the polarized lens (31),
polarizing filter (20) comprising a plurality of areas (25) for passing light, each area (25) being separated from the others, wherein each of the areas (25) is a linear polarizer and at least two of the areas (25) have a different polarization axis,
wherein the lens receiving section (30) and the polarizing filter (20) are arranged such that light (11) emitted by the light source (10) successively passes through the plurality of areas (25) of the polarizing filter (20) and the lens receiving section (30),
a light intensity measuring device (41) for receiving light (31) of the light source (10) which has passed the plurality of areas (25) of the polarizing filter (20) and the lens receiving section (30), wherein the light intensity measuring device (41) is configured to detect different light intensities related to the respective areas (25) of the polarizing filter (20), the polarized lens (31) being positioned in the lens receiving section (30),
wherein the light intensity measuring device (41) comprises a camera, a camera-based system, an individual light detector and/or a multiple light detector, and
a control system (40) to control at least the light intensity measuring device (41) for determining the orientation of the lens polarization axis of a polarized lens (31) positioned in the lens receiving section (30) based on the detected different light intensities of the respective areas (25) in correlation with their respective polarization axes.

2. The apparatus of claim 1, wherein the polarizing filter (20) is a polarizing filter disk, wherein the plurality of areas (25) are provided as windows in the disk body.

3. The apparatus of claim 1, wherein the polarizing filter (20) comprises an explicit or implicit reference based on which the polarization axes of the plurality of areas (25) can be derived,
wherein the reference comprises at least one of the group consisting of:
a reference mark on the polarizing filter (20),
the shape of the polarizing filter (20),
the position of at least one or more or all of the areas (25), with respect to each other and/or on the polarizing filter (20), and
the shape of at least one, or more or all of the areas (25).

4. The apparatus of claim 1, wherein the plurality of areas (25) are arranged in a checkered manner or along a circle (C).

5. The apparatus of claim 4, wherein the polarization axes of the plurality of areas (25) arranged along a circle (C) are each oriented such that they cross each other in a center (X) of the circle (C).

6. The apparatus of claim 1, wherein at least some of the areas (25), have an identical shape.

7. The apparatus of claim 6, wherein the at least some areas (25) have an arrow shape, wherein an arrowhead of the arrow-shaped area (25) points in a direction along the polarization axis of the arrow-shaped area (25).

8. The apparatus of claim 1, wherein the orientation of the different and distinguishable polarization axes is distributed over a range of at least 90°, and/or wherein the polarization axes of the at least two areas (25) having a different and distinguishable polarization axis form an angle α of at least 15°, respectively.

9. The apparatus of claim 8, wherein the angle a is at least 100.

10. The apparatus of claim 9, wherein the angle a is at least 5°.

11. The apparatus of claim 10, wherein the angle a is at least 20.

12. The apparatus of claim 1, wherein the polarizing filter (20) comprises a round or a polygonal shape.

13. The apparatus according to claim 1, wherein the polarizing filter (20) and the lens receiving section (30) are statically provided with respect to each other.

14. Method of determining an orientation of a lens polarization axis of a polarized lens (31), comprising the steps of:
providing an apparatus (1) according to claim 9,
placing a linearly polarized lens (31) to be detected in the lens receiving section (30),
operating the light source (10) to emit non-polarized light towards and successively through the plurality of areas (25) of the polarizing filter (20) and the polarized lens (31) in the lens receiving section (30),
detecting the different light intensities related to the respective areas (25) of the polarizing filter (20) of the light that has passed the areas (25) of the polarizing filter (20) and the polarized lens (31), and
determining the orientation of the lens polarization axis of the polarized lens (31) based on the detected different light intensities of the respective areas (25) in correlation with their respective polarization axes.

15. Method according to claim 14, wherein the step of detecting the different light intensities is carried out by the light intensity measuring device (41).

16. Method according to claim 14, wherein the step of determining the orientation of the lens polarization axis is carried out by the control system (40).

17. Method according to claim 16, wherein the control system (40) outputs the determined data and/or data received from the light intensity measuring device (41), to be displayed on an output device and/or for use in an edging step for edging the lens based on the orientation of the lens polarization axis and/or in a final inspection step after the edging step.

18. Apparatus (1) according to claim 1, wherein said determining of the orientation of the lens polarization axis of a polarized lens (31) positioned in the lens receiving section (30) is based on the detected different light intensities of the respective areas (25) in correlation with their respective polarization axes upon use of a reference (sinusoidal) calculation.

19. Apparatus (1) according to claim 1, wherein the control system (40) controls the apparatus (1) for determining the orientation of the lens polarization axis of a polarized lens (31) positioned in the lens receiving section (30) based on the detected different light intensities of the respective areas (25) in correlation with their respective polarization axes.

* * * * *